Jan. 6, 1970  J. L. HOFFA  3,487,696
PROBE TRANSFER MECHANISM
Filed Jan. 22, 1968  2 Sheets-Sheet 1

JACK L. HOFFA
INVENTOR.

BY *Paul R Harder*

ATTORNEY

Jan. 6, 1970  J. L. HOFFA  3,487,696
PROBE TRANSFER MECHANISM
Filed Jan. 22, 1968  2 Sheets-Sheet 2

JACK L. HOFFA
INVENTOR.

BY *Paul L. Harder*

ATTORNEY

United States Patent Office 3,487,696
Patented Jan. 6, 1970

3,487,696
PROBE TRANSFER MECHANISM
Jack L. Hoffa, Brea, Calif., assignor to Beckman Instruments, Inc., a corporation of California
Filed Jan. 22, 1968, Ser. No. 699,526
Int. Cl. G01n 1/10
U.S. Cl. 73—423                                9 Claims

ABSTRACT OF THE DISCLOSURE

A probe transfer for use in an automated chemical analyzer including a carriage moved by a pneumatic cylinder and pivotally mounting a probe controlled by forward and rear stops, the stops being adjustable to determine the amount of travel of the carriage and having means for controlling the amount of pivoting of the probe for dipping into a cup in a sample capsule at one end of travel and positioned over or dipping into another cup at the other end of travel in order to transfer liquid from one cup to the other. In a modified form of probe transfer, the probe is arranged to transfer from one cup to several other cups, its movement being controlled by a rotary stop that is rotated 60° by a ratched advance arm each time the cylinder is retracted, the ratchet being re-set by the rear stop and a spring at the final cup position, or the operation of the rotary stop can be shorted by moving the rear stop forward one, two or three positions, as desired, to limit the number of cups to which the sample is transferred from the one cup.

DISCLOSURE

This application is related to application Ser. No. 699,618 for Automated Chemical Analyzer, by Jerry E. Rochte et al., filed concurrently herewith.

The present invention relates to probe transfers for use in automated chemical analyzers and more particularly to a probe transfer which operates in a simple and reliable manner to dip into a cup in a sample capsule and deliver liquid therefrom to another cup and is adjustable as to the cups between which the probe operates; and, in an improved form thereof, is programmable so as to be capable of transferring liquid from one cup to several other cups, as desirable, in sequence.

In present day automated chemical analyzers, it is often necessary to transfer fluid from one container to another container, such transfer frequently requiring a probe to be dipped into fluid in one container to draw up some of the fluid into a duct or pipe, raise the probe, and then move it to another container where the fluid picked up is discharged, the discharge of the fluid also frequently requiring that the probe be lowered into the container.

It is therefore an object of the present invention to provide a probe transfer mechanism by which the probe is made to descend into a cup for picking up fluid therefrom and transfer the fluid picked up to another cup.

Another object is to provide a probe transfer which is economical to manufacture and reliable in its operation.

A further object is to provide a probe transfer which is easily adjustable for the positions relative to the cups between which it will operate.

Still another object is the provision of a probe transfer mechanism which may be programmed to transfer fluid from one cup to several other cups, as desired, in sequence.

A still further object is to provide a probe transfer which is versatile in its functioning so that it can be programmed to transfer from one cup to several other cups and the parts easily adjustable to reduce the number of cups to which the transfer is made during a cycle.

The aforementioned and other objects and advantages are achieved by a probe transfer mechanism embodying the principles of the present invention which contemplates and is concerned with a support bracket adjustably mounted on the automated chemical analyzer which supports a probe carriage for horizontal movement operated by an air cylinder, the carriage pivotally mounting a probe arm which at different points in its travel is engaged by adjustable stops for causing pivoting thereof and descent of a probe into the cup from which fluid is to be transferred, transferring the fluid, and positioning the probe over the cup to which the fluid is to be transferred. In a modified form of the probe transfer, transfer may be made from one cup to several other cups, in sequence.

Other objects, advantages and features of the present invention will become better understood by reference to the following detailed description when considered in connection with the accompanying drawing wherein.

Figure 1:
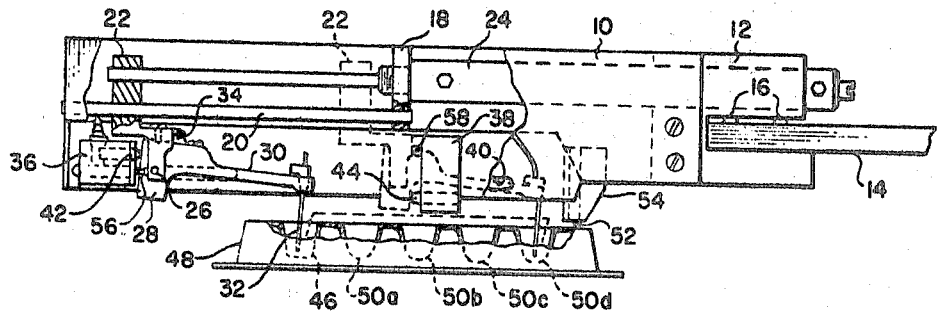
FIG. 1 is a side elevation of a probe transfer mechanism embodying the principles of the present invention, with portions thereof broken away, and showing its relationship to the cups of a sample capsule.
Figure 2:
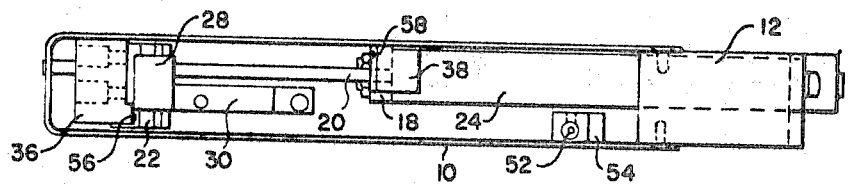
FIG. 2 is a bottom plan view of the probe transfer mechanism of FIG. 1.
Figure 3:
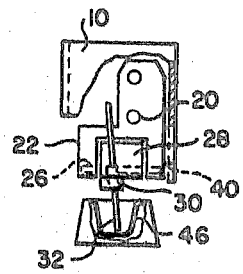
FIG. 3 is a front elevational view of the device of FIG. 1, partly in section.

Referring now to the drawing, there is shown in FIG. 1 a probe transfer mechanism embodying the principles of the present invention and including an elongated U-shaped support bracket 10, of strap metal or the like, having a mounting block 12 with a slot therein adapted to receive a structural support member 14 and be adjustably secured thereto as by adjustable clamp screws 16. Mounted in the forward end of the bracket 10 and in a rod mounting block 18 is a support rod 20 on which a probe carriage or slide 22 is slidably mounted and to which motion is imparted by a horizontal air cylinder 24 also mounted in the bracket. Pivotally mounted on the carriage 22, as by a pin 26, is a probe support of generally angular form including a pivot block 28 and an elongated arm 30 supporting a probe 32 at its free end. The probe may take the form of the end of a duct or pipe of plastic tubing. Interconnecting the probe arm and the carriage is a tension spring 34 biasing the arm upwardly. The extent of travel of the carriage or slide 22 is determined by a pair of stop blocks 36 and 38, adjustably secured in an elongated slot 40 formed in the side of the bracket 10, the forward stop 36 having an adjustable set screw 42 adapted to engage the pivot block 28 above its pivot connection 26 at one end of travel of the carriage, the inner adjustable stop 38 having an adjustable set screw 44 below the pivot connection. Thus, at the forward end of travel the pivot block 28 is engaged by set screw 42 to cause the probe arm 30 to swing downwardly and dip the probe 32 into the fluid in a cup 46 of a sample capsule 48, engagement of the pivot block by the set screw 44 on the inner stop block 38 also causing the probe to dip into another cup 50d of the capsule, as shown in phantom in FIG. 1. It is understood, of course, that the stop blocks 36 and 38 may be adjusted so that the probe operates between any two of the cups 46, 50a, 50b, 50c and 50d, and that the adjustment of each set screw adjusts the amount of dip of the probe and may be set so that the probe does not dip but is merely positioned over a cup, as desired.

The operation of the air cylinder 24 may be controlled by pneumatic logic, connected by flexible plastic tubing and triggered by normally closed pneumatic valves, which may also control a pump for picking up and discharging the sample fluid. For such purpose, a pneumatic valve 52 may be mounted in a trigger block 54 on the bracket and another pair of valves 56 and 58 in the stop blocks, 36 and 38, respectively, valve 52 being actuated by the capsule 48, the other two by the carriage 22. For a clearer understanding of the environmental use of the probe transfer mechanism and its relation to the other components of the automated chemical analyzer, reference may be made to the aforementioned application Ser. No. 699,618.

It is believed that the operation of the probe transfer mechanism is readily apparent from the foregoing description. However, briefly and in summary, actuation of the trigger 52 by the rising capsule triggers the air cylinder 24 to extend and move the carriage forward, causing the probe 32 to pivot and dip into the cup 46, and actuating the trigger 56 which triggers a pump (not shown) to draw in fluid through the probe. After the pump has drawn in a predetermined amount of the fluid, it triggers a power line (not shown) to the air cylinder to move the probe in the other direction, the tension spring 34 pulling up the probe arm 30 with the start of such movement. At the end of its inward travel the probe arm is again pivoted and the trigger 58 is actuated and triggers the pump to discharge the fluid that was drawn in.

Figure 4:
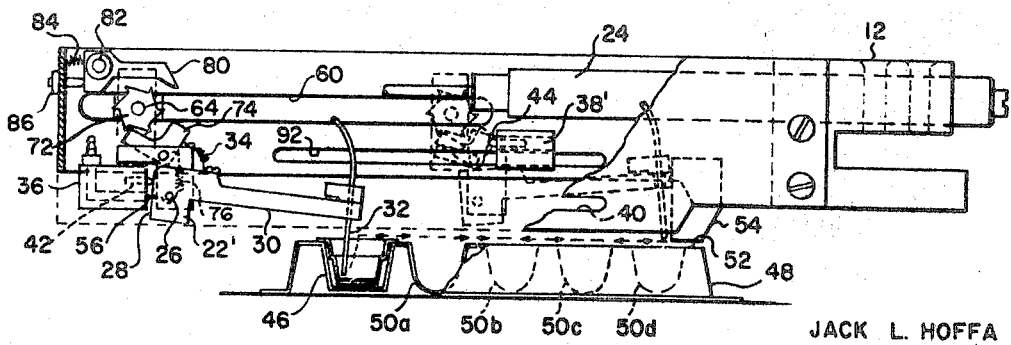
FIG. 4 is a side elevational view of a modified form of the probe transfer mechanism which is programmed to transfer from one cup to several other cups, in sequence, with portions thereof broken away and partly in section along line 4—4 of FIG. 6, and showing the relation of the mechanism to the cups in a sample capsule.

Turning now to FIG. 4, there is shown a modified form of the probe transfer mechanism which may be programmed to transfer fluid from one cup to several other cups in the capsule, in sequence, the basic probe transfer mechanism thus far described being modified to provide this additional capability. Accordingly, in the description of the programmed probe transfer that follows, like or somewhat similar parts will be referenced by the same numerals or primes thereof, respectively. The programmed probe includes a mounting block 12 to which a U-shaped bracket 10' is secured, the bracket being provided with a pair of slots 60, one in each side thereof and receiving a bearing 62 for sliding movement, the bearings journaling a rotatable shaft 64. Shaft 64 is also journaled in a probe carriage 22' which is conveniently coupled to air cylinder 24 and has a pivot pin 26 by which pivot block 28 is mounted thereon for pivoting arm 30 upon engagement with set screw 42 in stop block 36 adjustably secured in slot 40.

Secured to one end of shaft 64, externally of the bracket 10', is a rotor 66 carrying a pair of stop pins 68 and 70 disposed 120° apart, the former being shorter and having its free end spaced a greater distance from the side of the bracket than the latter, and also secured to the shaft within the bracket is a ratchet wheel 72 provided with six teeth equiangularly spaced therearound. Pivoted to the carriage 22' is a pawl 74 biased into engagement with the ratchet wheel 72 by a tension spring 76 connected between the pawl and the carriage. A coiled tension spring 78 is wound about shaft 64 and has one end thereof connected thereto and its other end secured in the carriage 22' for returning the ratchet wheel, as will later appear.

Figure 5:
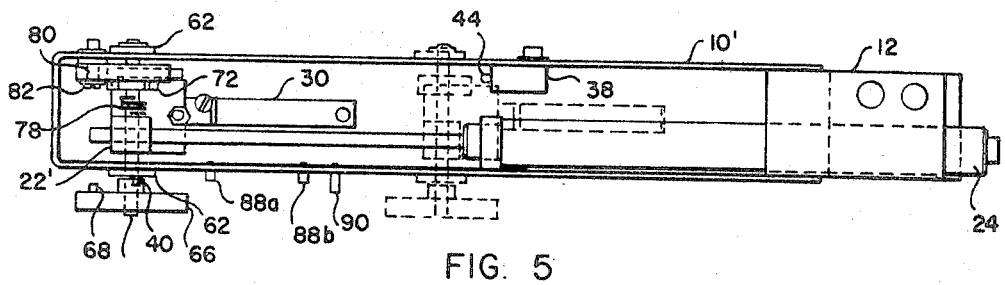
FIG. 5 is a top plan view of the mechanism of FIG. 4.

For actuating or advancing the ratchet wheel there is provided a detent or ratchet advance arm 80 pivoted to the bracket 10', as by a pivot screw 82, the end of the arm being biased into the path of the teeth of the ratchet wheel 72 by a compression spring 84, an adjustable set screw 86 serving to limit pivotal movement of the arm. The ratchet wheel 72 and the arm 80 serve to position the rotor 66 so that the stop pins 68 and 70 carried thereby are positioned to engage a pair of short abutments or stops 88a and 88b and a long abutment or stop 90 in predetermined order for positioning the probe 32 over each of the several cups, in sequence, as will become clearer from a description of the overall operation of the mechanism, the abutments being fixed to the bracket 10'. At the final cup position, shown in phantom in FIGS. 4 and 5, the pawl 74 is engaged by an adjustable set screw 44 in an inner stop block 38', adjustably mounted in a slot 92 in the side of the bracket 10', the set screw pivoting the pawl against the pressure of the ratchet wheel and the bias of spring 76 to release the ratchet wheel.

OPERATION

Figure 7A:
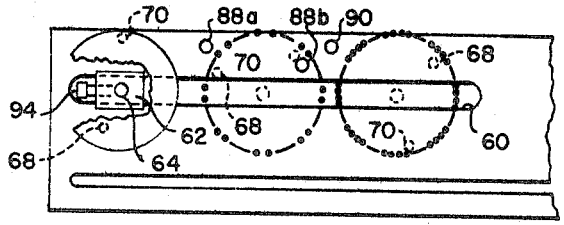
FIGS. 7a and 7b are fragmentary side views illustrating the positioning of the rotor and stop pins during programming of the mechanism of FIG. 4.
Figure 7B:
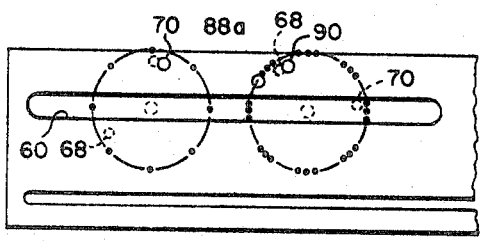
Figure 6:
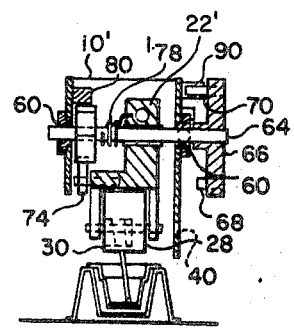
FIG. 6 is a vertical section taken generally along line 6—6 of FIG. 4.

In the operation of the programmed probe transfer mechanism, the starting position thereof is with the air cylinder 24 extended and the probe 32 over cup 46 of the capsule 48, FIG. 4. Referring to FIG. 7a, it will be noted that in such starting position the rotor (solid line) is adjacent to the forward end of the bracket 10' with long stop pin 70 near the top thereof and short pin 68 60° counterclockwise therefrom. Thus, with retraction of the air cylinder, pin 70 is engaged by short abutment 88a and the probe is stopped in a position over the cup 50a FIG. 7b (one-dot dash line). Extension of the air cylinder returns the probe over cup 46 and the rotor to its staring point, the arm 80 engaging the ratchet wheel 72 and turning it 60° clockwise, in which position it is then held by the pawl 74. The long pin 70 is now in line with short abutment 88b 60° around from its former position so that when the air cylinder is extended the probe is positioned over the cup 50b FIG. 7a (two-dot dash line). On return, the rotor is given another 60° turn which brings the short stop pin 68 around to the position formerly occupied by the long stop pin 70 in the starting position of the rotor, FIG. 7a. However, upon retraction of the air cylinder, pin 68, being short, passes by short abutment 88a and goes on to engage long abutment 90, FIG. 7b, disposing the probe over cup 50c (three-dot dash line). With another 60° turn in returning to the starting point, the pins 68 and 70 are positioned as shown in FIG. 7a, in which positions neither is in line with any of the abutments 88a, b or 90. Such being the situation, upon retraction of the air cylinder the probe is disposed over cup 50d FIG. 7a (four dot-dash line), pawl 74 is engaged and pivoted by the set screw 44, FIG. 4, releasing the ratchet wheel which under the bias of the coiled spring 78, built up by the 60° turns of the wheel, is turned counterclockwise until the long pin 70 engages an abutment or stop 94 (FIG. 7a) carried by the adjacent bearing slide 62. Extension of the air cylinder returns the probe over cup 46 and the arm 80 engages the ratchet wheel 72 to position the pins 68 and 70 as at the start of the cycle, ready to initiate another sequence (solid line) FIG. 7a.

It will be appreciated that stop block 38' may be adjusted in slot 92 so as to position it to have the set screw 44 pivot the pawl 74 and release the ratchet wheel, for start of another cycle, with the probe over any of the cups 50a–c as well as cup 50d, thus shortening the program of the programmed probe transfer mechanism. It will be further appreciated that suitable triggers may be associated with abutments 88a, b and 90 for control of a pump operatively connected with the probe.

There has thus been provided a probe transfer mechanism which is simple in construction, is economically fabricated and operates in a facile and reliable manner, and can be adjusted to transfer from one cup to several other cups.

What is claimed is:
1. A sample transfer mechanism comprising, in combination:
movable means mounted for generally horizontal linear travel;

probe support means mounted on said movable means for pivotal movement;

stop means determining the extent of travel of said movable means; and means on said stop means imparting pivotal movement to said probe support means.

2. The mechanism of claim 1 wherein:

said movable means comprises a slidably mounted carriage moved by pneumatic means; and said stop means comprises adjustably mounted stop blocks.

3. The mechanism of claim 1 wherein;

said movable means is supported for sliding movement on a support rod mounted in an elongated bracket;

said stop means comprises stop blocks mounted for adjustment on said bracket;

said probe support means comprises an elongated arm and a pivot block; and said means for imparting pivoted movement comprises set screws in at least one of said stop blocks for engaging said pivot block and causing said arm to pivot downwardly;

whereby a probe carried by said arm is caused to dip into a sample container at one end of said travel of said movable means for picking up a sample therefrom and for discharging the picked up sample into another container at the other end of said travel.

4. The mechanism of claim 1 further comprising:

additional stop means for causing said probe support means to be stopped and positioned at points intermediate the extent of travel of said movable means for transferring a sample from one container to a plurality of containers in sequence.

5. The mechanism of claim 4 wherein:

said additional stop means comprises rotatably mounted stops engageable with fixed stops; and ratchet and pawl means for positioning said rotatably mounted stops for sequential engagement with said fixed stops.

6. The mechanism of claim 5 wherein:

said ratchet and pawl means comprises a rotatable ratchet wheel and pivoted pawl mounted on said movable means;

said ratchet wheel and rotatably mounted stops are secured to a shaft journaled for rotation in said movable means; and means engageable with said ratchet wheel are provided for turning the same and positioning said rotatably mounted stops.

7. The mechanism of claim 6 wherein:

said movable means and said shaft are interconnected by a coiled spring wound thereabout which is further biased with turning of said ratchet wheel; and means engageable with said pivoted pawl are provided for releasing said ratchet wheel for turning thereof in the opposite direction by the bias of said coiled spring.

8. A sample transfer mechanism comprising, in combination:

an elongated support; a carriage mounted for linear travel on said support;

a probe arm pivotally mounted on said carriage;

stop means adjustably mounted on said support at the ends of said travel and determining the extent thereof;

said carriage having a shaft journaled therein;

a rotor fixed to said shaft and carrying stop pins;

abutments fixed to said support engageable by said stop pins with proper positioning of said rotor; and ratchet means including a ratchet wheel fixed to said shaft for properly positioning said rotor for engaging said stop pins with said abutments in sequence.

9. The mechanism of claim 8 wherein:

said shaft has a spring coiled thereabout with one end thereof secured to the shaft and the other end thereof secured to said carriage;

rotation of said ratchet wheel in one direction serves to build up bias in said spring; and means are provided for releasing said ratchet wheel for counter-rotation thereof by the built up bias of said spring for positioning said rotor to commence another sequence.

References Cited

UNITED STATES PATENTS

| | | | |
|---|---|---|---|
| 2,999,517 | 9/1961 | Gervinka | 141—118 |
| 3,239,312 | 3/1966 | Bell et al. | 73—423 X |
| 3,327,535 | 6/1967 | Sequeiva | 73—423 |

S. CLEMENT SWISHER, Primary Examiner

U.S. Cl. X.R.

23—253; 141—130, 284